US009557123B2

(12) United States Patent
Kreiselmaier

(10) Patent No.: US 9,557,123 B2
(45) Date of Patent: Jan. 31, 2017

(54) APPARATUS FOR THE INTERNAL TREATMENT OF PIPES

(75) Inventor: Richard Kreiselmaier, Venthone (CH)

(73) Assignee: Techno-Coat SA, Gelsenkirchen (DE)

( * ) Notice: Subject to any disclaimer, the term of this patent is extended or adjusted under 35 U.S.C. 154(b) by 0 days.

(21) Appl. No.: 13/877,761

(22) PCT Filed: Oct. 7, 2011

(86) PCT No.: PCT/EP2011/005009
§ 371 (c)(1), (2), (4) Date: Jul. 3, 2013

(87) PCT Pub. No.: WO2012/045466
PCT Pub. Date: Apr. 12, 2012

(65) Prior Publication Data

US 2013/0287943 A1 Oct. 31, 2013

(30) Foreign Application Priority Data

Oct. 7, 2010 (DE) ........................ 10 2010 047 589

(51) Int. Cl.
*B05B 13/06* (2006.01)
*B05D 7/22* (2006.01)
(Continued)

(52) U.S. Cl.
CPC ............. *F28G 9/00* (2013.01); *B05B 13/0627* (2013.01); *B05C 5/001* (2013.01); *B05C 7/02* (2013.01);
(Continued)

(58) Field of Classification Search
CPC ................ F28G 9/00; B05C 7/00; B05C 7/02; B05D 7/222
(Continued)

(56) References Cited

U.S. PATENT DOCUMENTS 3,473,961 A * 10/1969 Dege ........................ F28G 1/125 134/22.11
4,075,376 A * 2/1978 Jaeger .................. B23K 35/327 138/145

(Continued)

FOREIGN PATENT DOCUMENTS

WO WO 97/19758 A1 * 6/1997

*Primary Examiner* — William Phillip Fletcher, III
(74) *Attorney, Agent, or Firm* — Berliner & Associates

(57) ABSTRACT

The invention relates to a device for the internal treatment of pipes, in particular for coolant tubes of steam condensers and heat exchangers, comprising a supply unit (V) for feeding and conveying treatment media, an application unit (A) to apply the treatment media fed in by the supply unit, as well as a control unit to monitor and control the supplied treatment media and the application of treatment media to the inner wall of the pipes, wherein the application unit (A) is provided with a guiding hose (21) through which an application hose (18) extends designed so as to be inserted into the pipe to be treated, said application hose (18) terminating in a nozzle, wherein the application hose (18) can be wound up in a single layer on a driven reel (17) and secured on the reel (17) by means of tensioning belts, the application hose (18) is capable of moving forward and back via guide rollers (27) arranged on a traversing carriage (55), the guide rollers (27) are powered by a drive operating synchronously with the drive (19) of the reel (17), and the traversing carriage (55) moves parallelly to the reel axis relative to the extended position of the application hose (18).

14 Claims, 4 Drawing Sheets

(51) Int. Cl.

| | |
|---|---|
| ***B24C 3/32*** | (2006.01) |
| ***F16L 58/10*** | (2006.01) |
| ***B08B 9/043*** | (2006.01) |
| ***F28F 19/04*** | (2006.01) |
| ***B65H 75/44*** | (2006.01) |
| ***F28G 9/00*** | (2006.01) |
| ***B65H 51/10*** | (2006.01) |
| ***B05C 5/00*** | (2006.01) |
| ***B05C 7/02*** | (2006.01) |

(52) U.S. Cl.
CPC ............. *B05D 7/222* (2013.01); *B08B 9/0433* (2013.01); *B65H 51/10* (2013.01); *B65H 75/4407* (2013.01); *B65H 2701/33* (2013.01); *F28F 19/04* (2013.01)

(58) Field of Classification Search
USPC .. 118/317, DIG. 10, DIG. 13; 427/236, 238, 427/239; 134/22.1, 22.11, 22.12, 22.14, 166 R, 134/167 R, 167 C
See application file for complete search history.

(56) References Cited

U.S. PATENT DOCUMENTS 4,649,987 A * 3/1987 Frauenfeld ................ F28G 1/16 165/5
4,795,108 A * 1/1989 Appling ..................... 242/157.1
4,970,770 A * 11/1990 Jansson ................... B21C 37/24 29/460
2005/0087644 A1 * 4/2005 Kim ........................... 242/390.8

* cited by examiner

APPARATUS FOR THE INTERNAL TREATMENT OF PIPES

The invention relates to a device for the internal treatment of pipes, in particular for coolant tubes of steam condensers and heat exchangers, comprising a supply unit (V) for feeding and conveying treatment media, an application unit (A) to apply the treatment media fed in by the supply unit, as well as a control unit to monitor and control the supplied treatment media and the application of treatment media to the inner wall of the pipes, wherein the application unit (A) is provided with a guiding hose in which an application hose is carried designed so as to be inserted into the pipe to be treated, said application hose terminating in a nozzle.

It is known practice to provide steam condensers as they are employed for example in plants for the generation of electrical energy but also in other industrial fields with a plastic coating/lining to counteract corrosion hazards, in particular erosion attack.

Tubesheets and the coolant tubes/pipes they accommodate in plants for the generation of electrical energy are exposed to numerous external influences, especially to mechanical, chemical, and electrochemical stresses.

Mechanical stresses are encountered as a result of solid particles carried along by the cooling medium, for example sand. Moreover, due to the difference in temperature existing between the cooling medium and the condensing steam which may exceed 100° C. thermal stresses arise that lead to mechanical strains particularly in the region where the coolant pipes or tubes are rolled in.

Chemical stresses result from the nature of the cooling medium, for example whether it contains salts, basic or acidic substances. In particular the known corrosive action of seawater or severely contaminated river water is to be mentioned in this context.

Electrochemical or galvanic corrosion in this respect refers to corrosion hazards that occur through the formation of galvanic elements on metallic interfacial surfaces, especially in the transitional area between tubesheet and coolant pipe, said corrosion being greatly intensified by electrically conductive fluids, for example seawater or saline river water.

Another adverse effect concerns steam condensers the proper functioning of which may be impaired by deposits of undesirable substances, formation of algae etc. the occurrence of which may even be promoted by roughness caused through corrosion phenomena. This, however, means that in the course of the steam condenser operation the corrosion and deposition characteristics aggravate and negatively influence each other allowing an increasing number of starting points to develop so that even greater corrosion and deposits risks are faced.

For that reason efforts were made at an early stage to provide steam condensers with a corrosion-inhibiting coating of plastic material. In particular, coatings on the basis of epoxy resins were used for this purpose.

Initially, primarily the tubesheets were provided with such a coating but this approach could not solve the specific problems associated with the occurrence of corrosion and deposits inside the pipes. At a later date, a coating was also applied to the inlet and outlet of the pipes with a view to protecting this especially endangered transitional area. Measures of the kind mentioned above are known for example from GB-A-1 125 157, DE 1 939 665 U, DE 7 702 562 U, EP 0 236 388 A as well as EP 94 106 304 A.

It has been found, however, that only an extensive complete coating also of the coolant pipe itself will offer effective protection against corrosion on a long term basis. However, coating such coolant pipes on the inside causes enormous problems because of the considerable length of the pipes and due to the fact that their diameter is only small, all the more so as the coating must be as homogenous as can be accomplished. Moreover, the coating has to be carried out in the field and within an as short as possible period of time to keep plant downs time to a minimum. In view of the great number of coolant pipes in steam condensers comprising several thousand pipes this means the coating operation must be automated and standardized to the extent feasible.

As an additional requirement the coolant pipes have to be freed from old coating material, adhering deposits, and rust before the coating is applied. This is traditionally achieved by blasting methods using abrasive media, for example sand, set in rotational motion by means of a swirl nozzle, This operation causes significant amounts of contaminated blasting sand which has to be disposed of at great expense.

Known from WO 97/19758 A is an apparatus for the internal coating of pipes that comprises features of the kind first mentioned above. Basically, this apparatus has proved its worth but is nevertheless regarded improvable with regard to the technique and precision of applying the coating medium. With the prior-art apparatus there is, in particular, a tendency that the application hose is extended in a non-uniform manner when the system operates under high load conditions.

Another desirable requirement is that the coating agent is applied at a constant temperature in the range of between 20 and 40° C. Frequently, such a temperature cannot be adhered to in the winter, in enclosed spaces at longer operating times, or in southern countries which results in the coating quality to deteriorate—the coating compounds harden too slowly or too quickly and thus lose their protective effect and/or elasticity.

It is therefore desirable to provide a device by means of which the pipes and tubes to be coated can first be cleaned and freed from deposits including former coatings.

According to the invention this objective is achieved by providing a device of the kind first mentioned above, wherein the application hose can be wound up in a single layer on a driven reel and secured on the reel by means of tensioning belts, the application hose is capable of moving forward and back via guide rollers arranged on a traversing carriage, the guide rollers are powered by a drive operating synchronously with the drive of the reel, and the traversing carriage moves parallelly to the reel axis relative to the extended position of the application hose.

The inventive device is especially designed for a quick, uniform and largely standardized internal coating of coolant pipes/tubes, According to the invention it is also possible to clean the pipes and with the pipes prepared in this way provide them with a plastic coating, wherein coating times of one minute per pipe can be achieved without difficulty for pipe lengths of several meters. Another readily available option is to coat the pipes only in part, for example only the end areas, or apply several layers of different coating material, for example in the form of a primer, a first finishing coat, and a top coat.

Expediently, the application hose can be moved forward and back at a defined speed through the guiding hose and over its entire length and thus over the entire length of the pipe to be coated. For high-pressure applications, especially when pipes are to be cleaned internally using pressurized water, the hose should have a pressure resistance of up to 2,500 bar, while for coating purposes only a pressure resistance of up to 500 bar is usually considered sufficient. In any case, the hose must be of adequate stiffness to make sure it can properly extend into the pipe to be coated, with pressure-resistant hoses satisfying said stiffness requirements as a rule. The required pressure resistance can usually be achieved by hoses having a textile or metal fabric reinforcement.

The application hose through which the cleaning agent as well as the coating agent are introduced into the pipe to be coated is wound up in a single layer on a driven reel of the device and secured on the reel by means of tensioning belts. For hose rewinding purposes the reel is expediently provided with integrated hose guides in the form of grooves or rounded profiles suited to safely accommodate the individual hose windings and prevent said windings from being placed over another. The tensioning belt serves the same purpose. Since the feeding and retraction of the application hose must be performed in an orderly and controllable manner, hose winding is to be performed as precisely as possible. Hose feeding is governed in particular by the number of reel rotations performed.

The tensioning belts serve the purpose of securing the hose wound on the reel in parallel windings. Preferably, the tensioning belts are designed so as to be movable via rollers. Deflection and return run of the tensioning belts at the end points is brought about via rollers. The tensioning belts are movable and driven through frictional contact with the hose on the reel. The tensioning belts preferably encompass at least 270° of the reel, in particular at least 300°.

The application hose is moved forward and back via driven guide rollers arranged on a traversing carriage. Being unwound from the reel the application hose passes through a drive unit comprising several top and bottom mounted rollers arranged in series, said rollers enable the hose to be precisely advanced. The guide rollers are driven by means of a separate motor, preferably a servomotor, which is synchronized with the drive of the reel. This arrangement enables the application hose to be precisely advanced and retracted and exerts sufficient pressure to move the application hose into a cooling pipe even to a length of 20 meters and more.

The tensioning belts and the separate drive of the guide rollers, with the latter being attuned to the reel drive, are essential for a precise and reproducible operation of the application hose.

Expediently, also a metering roll is arranged on the traversing carriage serving to monitor the movement and, as the case may be, the speed of the application hose.

The traversing carriage is movable parallelly to the reel axis and traverses relative to and based on the unwinding position of the application hose. Since the application hose is arranged on the reel in parallel windings the hose detachmeat point from the reel also moves parallelly to the reel axis over the entire width of the reel. The traversing carnage follows the application hose run resulting in the hose, at the point where it leaves the reel, always entering the roller drive of the traversing carriage roughly at a right angle. This is an essential prerequisite for the precision of the coating operation and the reliable working of the equipment.

The guiding hose is directly mounted at the traversing carriage, i.e. at the side of the roller drive facing away from the reel. The hose length is sufficient to bridge the distance, in some cases several meters, between the device and the tube. The length of the application hose may be up to 30 m.

To enable the coating to be applied uniformly the reel may be provided with a temperature control unit, This unit serves to bring the treatment agent fed into the application hose via the reel to a conducive temperature, for example the coating agent, a hardening plastic mixture based on epoxy resin, to a standard temperature ranging between 20 and 40° C. If the device is used for the cleaning of pipes it may be necessary to heat the system up to prevent freezing at low temperatures. Temperature control is preferably achieved via a supply system using heating or cooling water.

Expediently, the inventive device is to be designed such that both the cleaning of a pipe and applying a coat of plastic material can be carried out during return travel. For this purpose, the treatment hose is inserted into and up to the end of the pipe to be treated and the respective operation started when the pipe end has been reached and stopped at the pipe starting point. It is to be understood that specially designed and suitable nozzles are used for the cleaning operation, and for coating purposes nozzles especially and suitably designed for this particular work. Basically, nozzles of this kind are known.

Preferably, the nozzles emit the treatment medium in a circular pattern at roughly a right angle in relation to the longitudinal direction of the pipe. In general, spraying angles ranging between 60 and 120° in relation to the longitudinal direction of the pipe are thought expedient.

In the application hose, in particular in the immediate proximity of the spray nozzle, a fine filter is preferably arranged which serves to prevent the nozzle from clogging due to the ingress of particles, as well as a non-return valve interrupting the material flow without greater delay to avoid coating material exiting after the coating material application has been completed. For example, the non-return or end valve is actuated at a pressure of 10 bar.

In the area of the supply system a coarse filter is expediently arranged in an intake connection or hose, said filter serves the purpose of making sure the coating material taken from a reservoir is entering the system free from coarse particles. As supply pump a backpressure-dependent piston pump is to be employed which ensures material is conveyed as long as spray material is discharged. The piston pump also serves to build up the application pressure needed to operate the device.

In the section where the material is conveyed from the supply pump to the spray nozzle a non-return valve together with a dual filtering system is advantageously arranged by means of which the coating material is additionally filtered. This arrangement provides for two filtering units to be arranged in parallel and equipped with a differential pressure monitoring system which may serve as clogging indicator. Differential pressure monitoring is effected via the control unit which expediently also indicates the respective values and via a measuring cell monitors the flow of material and controls the operation of the filters. This makes sure the flow of material can be maintained over a long period and filter clogging detected and signaled early enough to enable a given coating operation to be completed in an orderly manner and without having to abort it prematurely.

Two control valves safeguarded at 200 bar make sure the flow of material is securely controlled.

From the supply unit with the filtering system and measuring cell the material is directly fed to the application unit via a pressure-resistant hose, said application unit comprising the application hose wound up on a reel. The reel can be driven by electric motor which in turn is controlled by the control unit. Depending on the relevant mode of operation the application hose is unwound from or taken up on the reel, wherein said hose enters the guiding hose after it has been passed through the drive rollers on the traversing carriage.

As third functional system the inventive device has been provided with a control unit that in particular monitors, controls and indicates the intake and discharge volumes and the pressure. The control unit ensures the proper functioning as well as trouble-free operation of the apparatus. It can also been programmed with respect to feed length, feed speed, and retraction speed of the application hose, moreover with respect to spraying velocity and discharge volume. Especially the capability of programming and varying the feed length of the application hose and its retraction speed in combination with the discharge of the treatment agent enables a great number of coolant pipes to be treated quickly and reliably in a standardized manner. As treatment medium especially water or another liquid cleaning agent is used for pipe cleaning whereas a hardening plastic material serves for pipe coating purposes.

The inventive device is preferably of mobile design so that is can be easily moved and positioned at the place where it is used. In this context it is expedient to combine the control unit and the supply unit to form a traveling unit connected to the application unit via a pressure-resistant supply hose and, as may be required, a cable connection for manual control. The supply hose arranged between the control/supply unit and the application unit may be of optional length. In this manner, the relatively sensitive control/supply unit can be operated remotely from the application unit which may be of advantage not only for space reasons but also to protect the sensitive components of the unit.

As described hereinbefore, the inventive device is operated by means of a control unit. Start and end of the individual treatment steps, i.e. unwinding the application hose and positioning the nozzle, the retraction of the application hose during operation when either pressurized water or coating medium is sprayed, as well as the abortion of the treatment are effected by means of the manual control unit.

It is furthermore appropriate to provide the apparatus with emergency functionality so that the operator is in a position to terminate all operations via an emergency off button. Another expedient feature is to provide a forced switch-off function taking effect when the prescribed discharge volume or the preset pressure is fallen short of or exceeded, or if there is a deviation from the programmed traversing speed. It is to be noted that when cleaning a pipe with water under high pressure of approx. 2,000 bar and the active nozzle does not move for a period of one or two minutes the pipe will be severed at the position where the nozzle is positioned/stationary.

The inventive device is especially employed for the cleaning and/or coating of the inner wall of coolant pipes and industrial supply piping. Moreover, pipes of smaller diameter can also be treated without difficulty, for instance pipes of a diameter of 10 mm or less. If the device is employed for internal cleaning, especially water at a pressure ranging between 1,500 and 2,500 bar is used as cleaning agent and applied via a nozzle with circular spray pattern with a spray angle between 60 and 120° in relation to the longitudinal direction of the pipe, but with spraying preferably performed at a right angle. The same device may subsequently or alternatively used for the internal coating of pipes using a hardening plastic material. It shall be understood that in each case especially suited nozzles are to be used for the cleaning process on the one hand and also for the relevant coating operation, with said nozzles being known per se. For coating purposes the coating agent is usually spray-applied at a maximum pressure of 250 bar.

The invention is explained in more detail by way of the enclosed figures where

Figure 1:
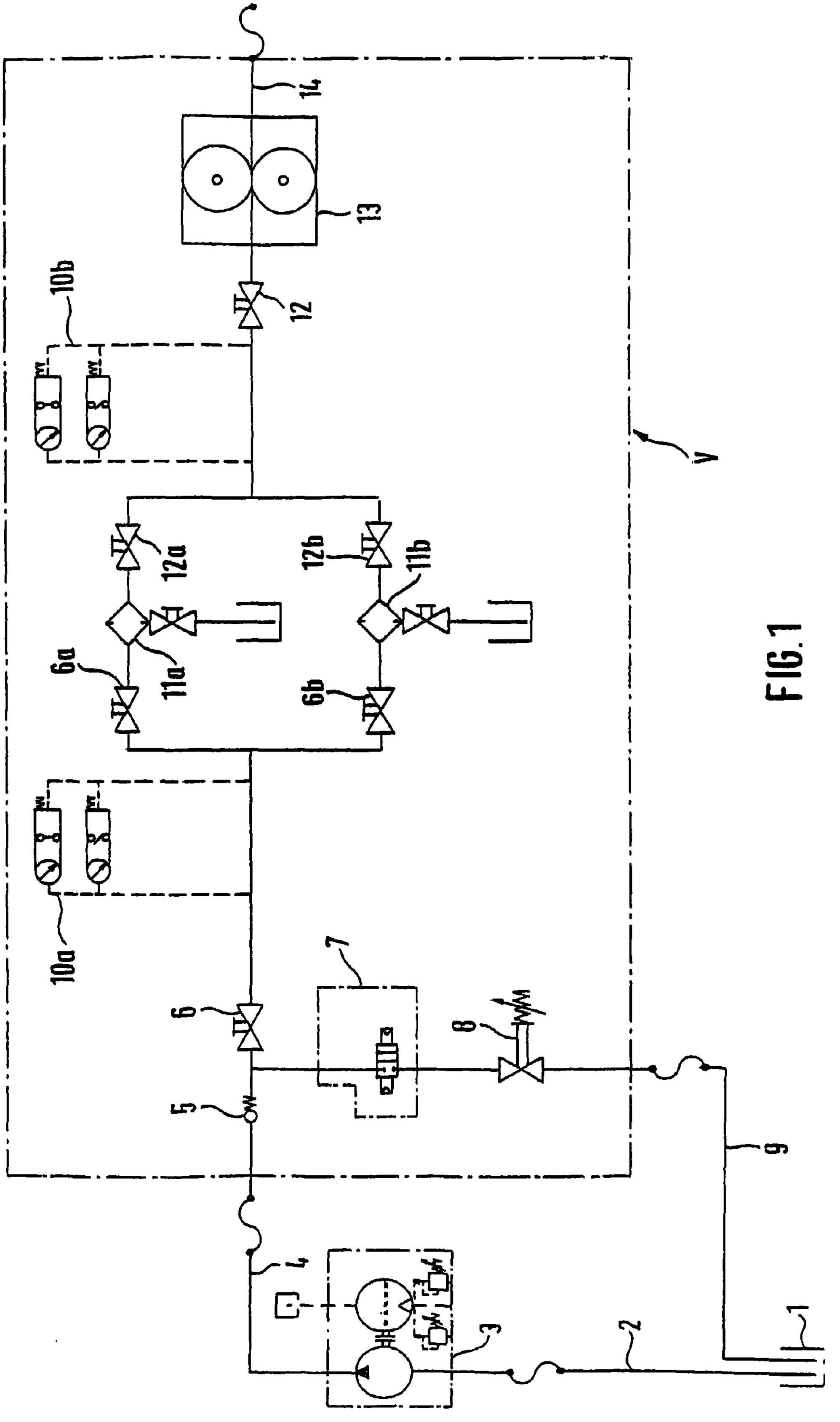
FIG. 1 shows the circuit diagram of the material supply unit.

FIG. 1 shows the supply unit with intake hose 2 through which the coating material is withdrawn from a reservoir 1 by means of pump 3. Hose 2 must not be of pressure-resistant design and may for instance have a diameter of 19 mm.

Pump 3 advantageously a compressed-air driven double-acting piston pump capable of taking in material and discharging it under pressure. The pump operates backpressure-dependent in a self-acting manner, i.e. material is conveyed only if spraying material is discharged or withdrawn, for instance when the coating operation is initiated. For example, a pump capacity of 27 l/rain at 0 bar will be sufficient to easily achieve pressure rates of up to 500 bar.

The piston pump conveys the material through a pressure-resistant line 4 having for example a diameter of 10 mm via a non-return valve 5 and a ball valve 6 to a dual filtering unit 11*a*/11*b*. Between non-return valve 5 and ball valve 6 a return line 9 is arranged which serves to feed material back into the reservoir via pneumatically actuated ball valve 7 and a backpressure control group 8 provided with pressure controller.

The dual filtering unit 11*a*/11*b* is provided with two pressure sensors 10*a*/10*b* which enable differential pressure monitoring to be effected via the central control unit. As a rule, the differential pressure monitoring function is intended to serve as filter clogging detector so that when one filter is clogged the unit can switch over to the other filter in good time and steps can be taken early enough to make sure a given coating operation can be completed in an orderly way. The filtering units can be replaced without difficulty by appropriately actuating ball valves 6*a*/12*a* and 6*b*/12*b*. A commercially available measuring cell 13, for example a gear-type measuring cell or an ultrasonic measuring cell, makes sure the flow of material can be reliably monitored and visualized in the central control unit to which the data needed to control the coating operation are transferred, said data being obtained by evaluating the differential pressure measurement, measuring cell data and the capacity data of pump 3.

Figure 2:
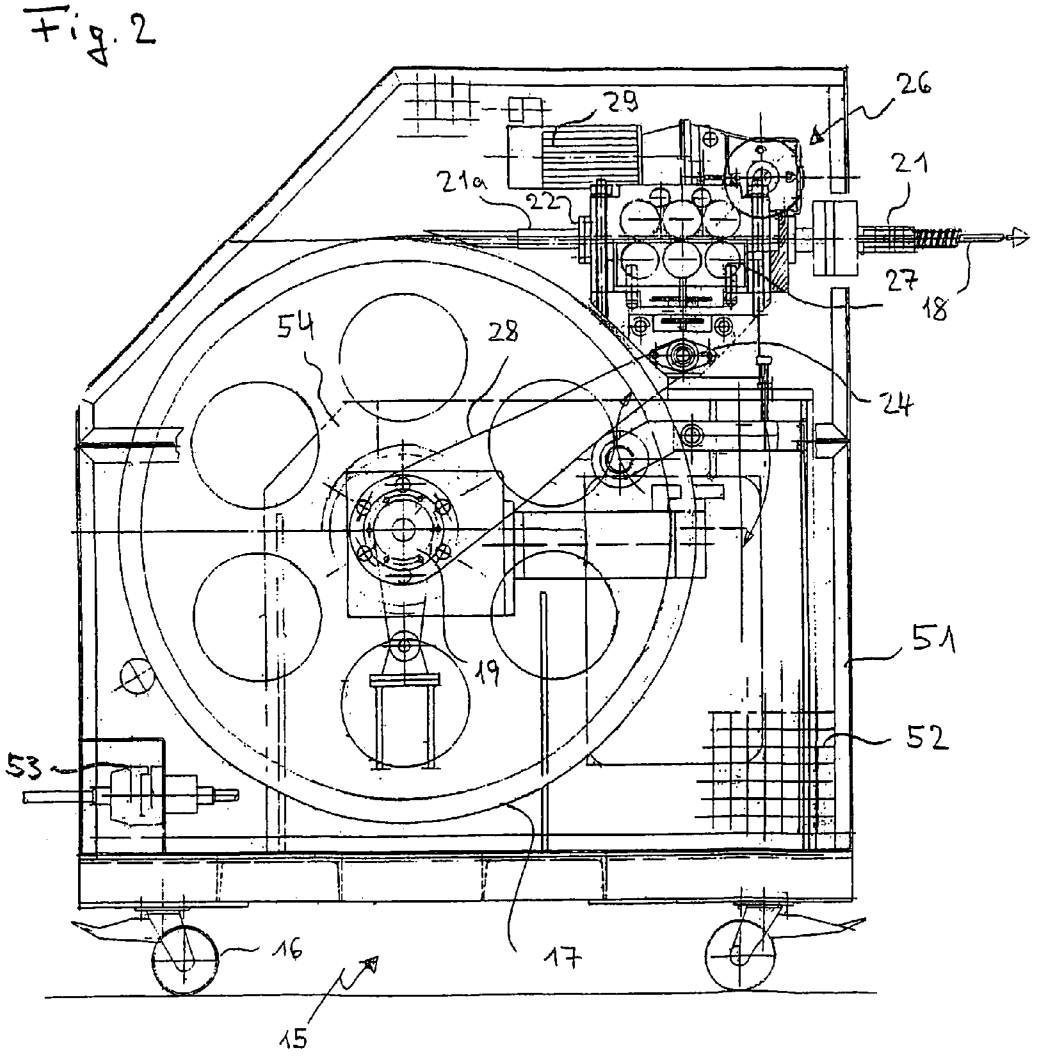
FIG. 2 is a side view of the application unit.
Figure 3:
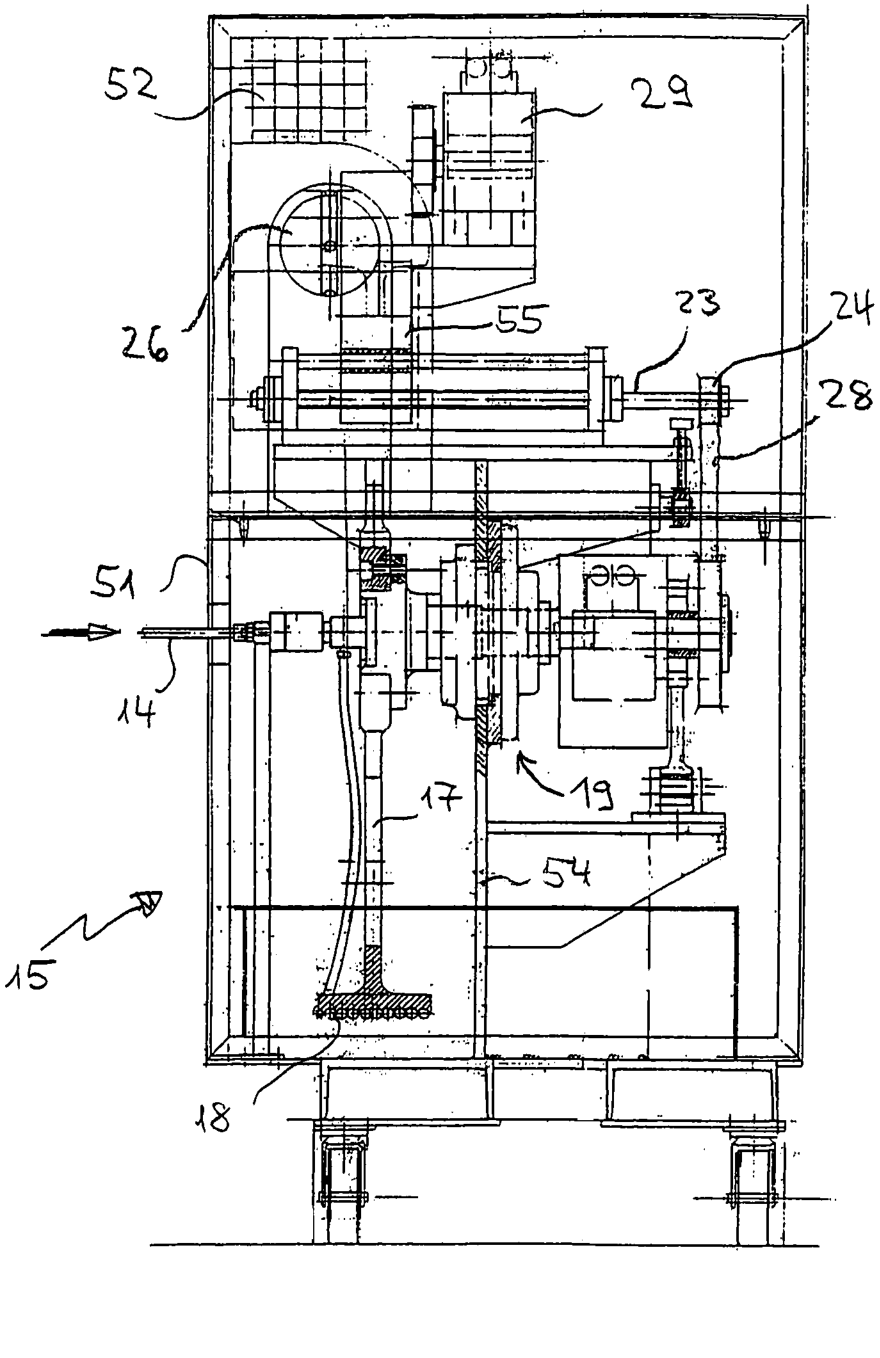
FIG. 3 is a frontal view of the application unit.

From measuring cell 13 the conveyed material is transferred via line 14 to application unit A as illustrated in accordance with FIGS. 2 and 3.

Application unit A is arranged on base 15 provided with rollers 16, wherein reel 17 is mounted on said base. Reel 17 accommodates the application hose 18 capable of being unwound and retracted by means of motor 19. Material is supplied via feed connection 20 to which hose 14 of the supply unit V is attached. From feed connection 20 material is conveyed via a rotary feedthrough to application hose 18 and further on to the application nozzle (not shown).

The mobile base 15 is provided with a frame 51 which accommodates, if thought necessary, corrugated wire mesh 52. A power supply appliance is shown against reference number 53 while reel 17 is supported by a retaining element 54.

From reel 17 the application hose 18 extends through a guiding hose 21*a*. Guiding hose 21*a* is located at intake element 22 in the upper part of the reel 17, said hose being moved by means of a traversing carriage 55 along a stationary guide system 23 so that it is capable of following the windings of application hose 18 in horizontal direction on reel 17 when the application hose 18 is unwound or retracted. Drive 24 of the traversing carriage is coupled to the motor 19 via a toothed belt 28 which enables the traversing carriage 55 with the guiding hose intake element 22 to be moved synchronously with the unwinding and retraction operation. The process of unwinding and rewinding the hose can be terminated by limit switches arranged at the ends of guide system 23.

From the reel the application hose 18 extends into guiding hose 21*a*. The guiding hose 21 is subdivided, with the drive unit 26 for application hose 18 being arranged within the gap, said drive unit comprising a total of 6 guide and drive rollers 27. Drive unit 26 is movably arranged on traversing carriage 55 and follows the windings of the application hose 18 on reel 17, Drive 24 of the traversing carriage 55 is brought about via a toothed belt 28 which is driven by reel motor 19 and in this manner ensures the traversing carriage moves synchronously via a spindle with trapezoidal thread. Rollers 27 of the application hose drive are rotated by servomotor 29 coupled with the reel motor 19 so that in this case as well the feed movement of the application hose is synchronous with the hose unwinding from reel 17. Maximum feed/retraction speed rates of up to 4.5 m/sec are achieved.

At the end of application hose 18 a nozzle is arranged by means of which the coating agent can be applied to the inner wall of a cleaned pipe; however, via the nozzle the pipe can also be blast-cleaned inside under high pressure in which case a cleaning agent is to be fed into the application unit A. Normally, the cleaning agent is water applied to the inner wall of the pipes at a high pressure of up to 2,500 bar.

The reel 17 may be provided with a heating or cooling water supply system intended to heat or cool the coating agent passing through the hose to a temperature conducive to the relevant application. However, the application unit may also be equipped for this purpose with a separate heating or cooling coil arranged upstream of the reel.

Figure 4:
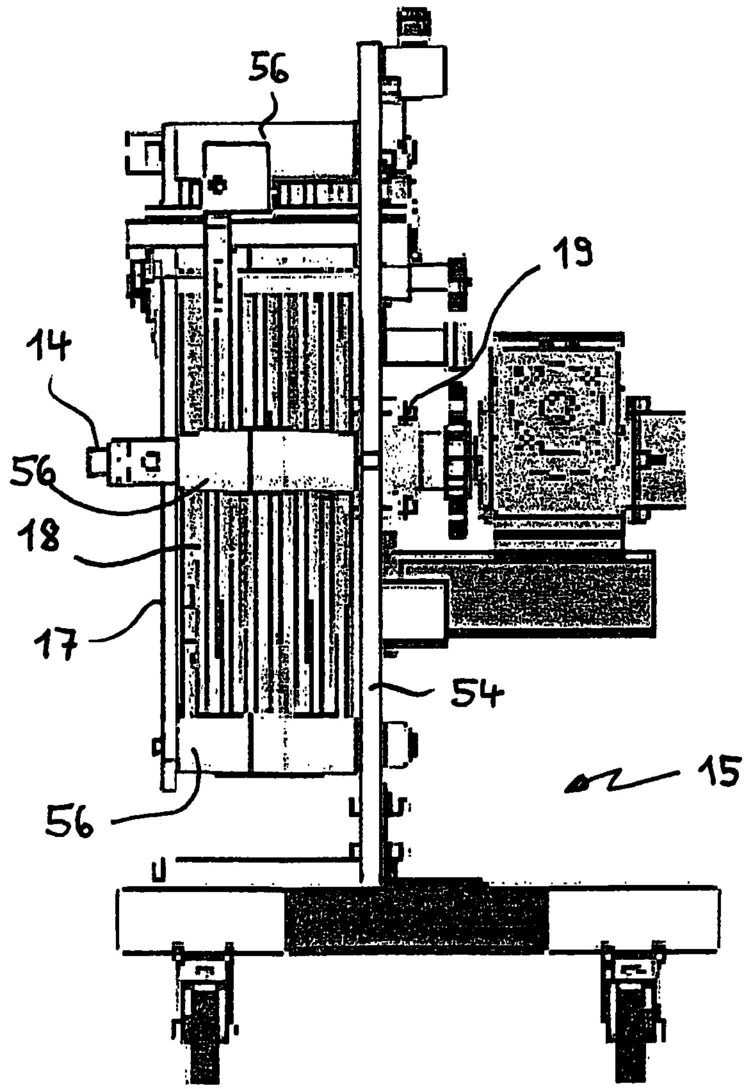
FIG. 4 shows the roller fixation system of the tensioning belts.

FIG. 4 illustrates application unit A with base 15, retaining element 54 for the reel 17 and the motor 19, the application hose 18 wound up on reel 17, and three rollers 56 via which the tensioning belts are secured.

Expediently, the tensioning belts embrace the reel 17 over 270° of its circumference, wherein that portion of the reel remains clear/uncovered through which the application hose 18 is passed on to the hose drive unit 26. At least one of the rollers 56 securing the tensioning belts is movably arranged so that the tensioning belts passing around the rollers can be retightened.

Rollers 56 are equally spaced over the circumference of the reel, advantageously spaced at 90° over the circumference. Passing over and around the rollers is a belt of elastic material, for example rubber or plastic material, said belt between retaining rollers 56 being positioned onto and in close contact with the wound-up application hose 18 and in this way holds the hose in place on the reel and in the guide grooves arranged on the reel. The tensioning belt or belts pass over the movable rollers and rotate together with the hose reel 17 as soon as the reel starts moving. The belt is driven by the rotating reel. In this way any displacement of the application hose is ruled out when the tensioning belts have been properly tightened so that the hose cannot leave the guide grooves arranged on the reel. Said tensioning belts are essential for the precise and smooth operation, i.e. unwinding/retracting, of the application hose.

The invention claimed is:

1. A dual use device for the internal treatment of pipes for coolant tubes of steam condensers and heat exchangers, the device being designed for internal high pressure cleaning and coating of pipes comprising a supply unit (V) for feeding and conveying treatment media capable of said dual use by in one use providing a cleaning medium at a pressure of between 1,500 and 2,500 bar and in a second use providing a coating material at up to 500 bar, an application unit (A) to apply the treatment media fed in by the supply unit, as well as a control unit to monitor and control the supplied treatment media and the application of treatment media to the inner wall of the pipes, wherein the application unit (A) is provided with a guiding hose (21) through which an application hose (18) extends designed so as to be inserted into the pipe to be treated, said application hose (18) terminating in a nozzle, characterized in that, the application hose (18) can be wound up in a single layer on a driven reel (17) and secured on the reel (17) by means of tensioning belts, the application hose (18) is capable of moving forward and back via guide rollers (27) arranged on a traversing carriage (55), the guide rollers (27) are powered by a drive (24) operating synchronously with the drive (19) of the reel (17), and the traversing carriage (55) moves parallelly to the reel axis relative to the extended position of the application hose (18), and wherein the cleaning medium is water and the coating material is hardening plastic.

2. Device according to claim 1, characterized in that the reel (17) is designed to be brought to a standard temperature.

3. Device according to claim 2, characterized in that the reel (17) is provided with a heating/cooling water supply system.

4. Device according to claim 1, characterized in that the reel (17) is provided with a guiding system for the application hose (18).

5. Device according to claim 1, characterized in that the tensioning belts are movably guided via rollers (56).

6. Device according to claim 5, characterized in that the tensioning belts are moved as a result of frictional contact with the application hose (18) when the reel (17) is rotating.

7. Device according to claim 1, characterized in that the tensioning belts embrace more than 270° of the circumference of the reel.

8. Device according to claim 1, characterized in that the application hose (18) is a high-pressure hose having a pressure resistance of up to 2,500 bar.

9. Device according to claim 1, characterized in that the application hose (18) can be controllably extended and retracted over the entire length of the pipe to be treated.

10. Device according to claim 1, characterized in that the application hose (18) is equipped with a coating nozzle designed so as to enable coating to be effected during return travel, wherein the spraying angle amounts to between 60° and 120° in relation to the longitudinal direction of the pipe to be treated.

11. Device according to claim 1, characterized in that the supply unit (V) is provided with an intake hose (2) equipped with a coarse filter, said hose being connected with a backpressure-dependently operating supply pump (3).

12. Device according to claim 1, characterized by a non-return valve (5) and a dual filtering system (11*a*/11*b*) in the area where material is supplied to the application unit (A).

13. Device according to claim 1, characterized in that the control unit monitors and controls the intake/discharge volume of the treatment agent as well as the operating pressure.

14. Device according to claim 13, characterized in that the control unit is programmable with respect to feed length, feed speed, and/or retraction speed of the application hose.

* * * * *